US011507900B2

(12) United States Patent
Tsang

(10) Patent No.: US 11,507,900 B2
(45) Date of Patent: Nov. 22, 2022

(54) USER ATTRIBUTE INFORMATION VERIFICATION METHOD AND SYSTEM, COMPUTER DEVICE, AND STORAGE MEDIUM

(71) Applicant: Hing Hang Tsang, HongKong (CN)

(72) Inventor: Hing Hang Tsang, HongKong (CN)

( * ) Notice: Subject to any disclaimer, the term of this patent is extended or adjusted under 35 U.S.C. 154(b) by 317 days.

(21) Appl. No.: 16/661,544

(22) Filed: Oct. 23, 2019

(65) Prior Publication Data
US 2021/0117888 A1   Apr. 22, 2021

(30) Foreign Application Priority Data
Oct. 22, 2019  (EP) .................................... 19204644

(51) Int. Cl.
*G06Q 10/06* (2012.01)
*H04L 9/40* (2022.01)

(52) U.S. Cl.
CPC ........ *G06Q 10/06311* (2013.01); *H04L 63/06* (2013.01); *H04L 63/126* (2013.01)

(58) Field of Classification Search
CPC ...... G06Q 10/06311; G06Q 10/063112; H04L 63/06; H04L 63/126
See application file for complete search history.

(56) References Cited

U.S. PATENT DOCUMENTS

| | | | | |
|---|---|---|---|---|
| 7,212,985 | B2 * | 5/2007 | Sciuk | G06Q 10/1053 700/104 |
| 7,487,104 | B2 * | 2/2009 | Sciuk | G06Q 10/06316 705/7.26 |
| 2009/0204470 | A1 * | 8/2009 | Weyl | G06Q 10/06 705/7.13 |
| 2009/0204471 | A1 * | 8/2009 | Elenbaas | G06Q 10/06 705/7.13 |
| 2011/0270763 | A1 * | 11/2011 | Graham, III | G06Q 20/3829 705/71 |

(Continued)

FOREIGN PATENT DOCUMENTS

WO   WO-2018222590 A1 * 12/2018 ......... G06Q 30/0207

*Primary Examiner* — Alina A Boutah

(57) ABSTRACT

The present application relates to a user attribute information verification method and system, a computer device, and a storage medium. The method comprises: acquiring a task to be assigned, and generating an assignment indicator according to the task to be assigned; uploading the task to be assigned to a sharing platform; receiving information to be verified returned by the sharing platform, wherein the information to be verified comprises user information and a task identifier; acquiring a verification configuration file, wherein the verification configuration file comprises sc a user attribute and an attribute verification record; evaluating the user information according to the user attribute and the attribute verification record to obtain a verification result of the user information; and generating, when the verification result reaches the assignment indicator corresponding to the task to be assigned, prompt information representing that the verification of the user information is passed, wherein the prompt information is used to instruct the sharing platform to assign the task to be assigned to a corresponding user terminal. By means of the method, efficiency of user information verification can be improved, thereby reducing labor and time costs.

6 Claims, 4 Drawing Sheets

(56) References Cited

U.S. PATENT DOCUMENTS

| | | | | |
|---|---|---|---|---|
| 2011/0283365 A1* | 11/2011 | Moritz | .................... | H04L 63/10 |
| | | | | 726/28 |
| 2013/0159040 A1* | 6/2013 | Sarmenta | .............. | G06F 15/173 |
| | | | | 705/7.15 |
| 2013/0275329 A1* | 10/2013 | Starr | ...................... | G06Q 10/00 |
| | | | | 705/345 |
| 2013/0275803 A1* | 10/2013 | Kern | ........................ | G06F 40/51 |
| | | | | 714/15 |
| 2015/0101008 A1* | 4/2015 | Zent | ........................ | H04L 63/20 |
| | | | | 726/1 |
| 2015/0254596 A1* | 9/2015 | Nayar | ............ | G06Q 10/063112 |
| | | | | 705/7.14 |
| 2015/0332187 A1* | 11/2015 | Yankelevich | .. | G06Q 10/063118 |
| | | | | 705/7.13 |
| 2016/0255139 A1* | 9/2016 | Rathod | .................... | H04L 67/10 |
| | | | | 709/203 |
| 2016/0292011 A1* | 10/2016 | Colson | ............. | G06Q 10/06311 |
| 2016/0371471 A1* | 12/2016 | Patton | .................... | H04L 63/102 |
| 2017/0237717 A1* | 8/2017 | Starosielsky | ......... | G06F 21/602 |
| | | | | 713/176 |
| 2018/0165650 A1* | 6/2018 | Kashyape | ............... | H04N 7/155 |
| 2020/0293995 A1* | 9/2020 | El Shawwa | ........... | G06F 9/5005 |
| 2020/0364646 A1* | 11/2020 | Arar | ............... | G06Q 10/063112 |

* cited by examiner

USER ATTRIBUTE INFORMATION VERIFICATION METHOD AND SYSTEM, COMPUTER DEVICE, AND STORAGE MEDIUM

TECHNICAL FIELD

The present invention relates to the field of Internet technologies, and in particular, to a user attribute information verification method and system, a computer device, and a storage medium.

BACKGROUND ART

Sharing economy is a new economic model that has emerged recently, which enables companies and individuals to share corresponding economic resources in an open market. Crowdsourcing, as a way of applying the sharing economy to the Internet, one of the implementation is that a company or an organization outsources a task which would formerly have been performed by an employee of a company to a sharing platform, so that the task will be performed by a user in the sharing platform. To ensure that the task can be effectively performed by a trustworthy person, a user's background and qualification need to be verified.

In a conventional way, user information in a sharing platform is verified mainly in a manual verification-based way, such as video call, telephone communication, etc. Such manual verification-based way wastes a lot of labor and time costs, resulting in relatively low efficiency of user attribute information verification.

SUMMARY OF THE INVENTION

On this basis, for the above technical problem, it is necessary to provide a user attribute information verification method and system, a computer device, and a storage medium that can improve verification efficiency.

A user attribute information verification method is provided, the method comprising:

acquiring a task to be assigned, and generating an assignment indicator according to the task to be assigned;

uploading the task to be assigned to a sharing platform;

receiving information to be verified returned by the sharing platform, wherein the information to be verified comprises user information and a task identifier;

acquiring a verification configuration tile, wherein the verification configuration file comprises a user attribute and an attribute verification record;

evaluating the user information according to the user attribute and the attribute verification record to obtain a verification result of the user information; and generating, when the verification result reaches the assignment indicator corresponding to the task to b, assigned, prompt information representing that the verification of the user information is passed, wherein the prompt information is used to instruct the sharing platform to assign the task to be assigned to a corresponding user terminal.

In one of the embodiments, the method further comprises: acquiring verification rule logic, wherein a correspondence relation between the attribute verification record and the verification result is preset in the verification rule logic; and the step of evaluating the user information according to the user attribute and the attribute verification record to obtain the verification result of the user information comprises:

verifying the user information according to the correspondence relation between the attribute verification record and the verification result in the verification logic rule to obtain the verification result of the user information.

In one of the embodiments, the user information further comprises a verification party identifier and a corresponding verification result; and the step of evaluating the user information according to the user attribute and the attribute verification record to obtain the verification result of the user information comprises:

setting a verification weight for the verification result according to the verification party identifier; and performing weighted calculation on the verification result according to the verification weight to obtain a comprehensive score of the user information.

In one of the embodiments, the user information further comprises a verification party identifier, a verification attribute, and a corresponding attribute score; and the step of evaluating the user information according to the user attribute and the attribute verification record to obtain the verification result of the user information comprises;

separately setting different weights for the verification attributes according to the verification party identifier;

performing weighted calculation on the attribute score according to the weight of the verification attribute to obtain a weighted score of each verification attribute; and accumulating weighted scores of all verification attributes to obtain a comprehensive score of the user information.

In one of the embodiments, the method further comprises:

acquiring a verification party identifier of a current verification party and a corresponding private key, and encrypting and signing the verification result using the verification party identifier of the current verification party and the private key; and adding the encrypted and signed verification result to the verification record for storage.

A user attribute information verification system is provided, the system comprising:

a service party terminal for acquiring a task to be assigned, and generating an assignment indicator according to the task to be assigned, wherein the service party terminal is further for uploading the task to be assigned to a sharing platform;

the service party terminal is further for receiving information to be verified returned by the sharing platform, wherein the information to be verified comprises user information and a task identifier;

the service party terminal is further for acquiring a verification configuration wherein the verification configuration file comprises a user attribute and an attribute verification record;

the service party terminal is further for evaluating the user information according to the user attribute and the attribute verification record to obtain a verification result of the user information; and the service party terminal is further for generating, when the verification result reaches the assignment indicator corresponding to the task to be assigned, prompt information representing that the verification of the user information is passed, wherein the prompt information is used to instruct the sharing platform to assign the task to be assigned to a corresponding user terminal.

In one of the embodiments, the service party terminal is further for incorporating verification rule logic, wherein a correspondence relation between the attribute verification record and the verification result is preset in the verification rule logic; and the service party terminal is further for verifying the user information according to the correspondence relation between the attribute verification record and the to verification result in the verification logic rule to obtain the verification result of the user information.

In one of the embodiments, the user information further comprises a verification party identifier and a corresponding verification result; and the service party terminal is further for setting a verification weight for the verification result according to the to verification party identifier; and performing weighted calculation on the verification result according to the verification weight to obtain a comprehensive score of the user information.

A computer device, comprising a memory, a processor, and a computer program stored on the memory and operable on the processor, Wherein when the processor executes the computer program, steps of any one of the methods are implemented.

A computer readable storage medium is provided, having stored thereon a computer program that, when the computer program is executed by a processor, steps of any one of the methods are implemented.

According to the user attribute information verification method and system, the computer device, and the storage medium, the task to be assigned is uploaded to the sharing platform; the information to be verified returned by the sharing platform is received; the user information is evaluated according to the user attribute and the attribute verification record in the verification configuration file to obtain the verification result of the user information; and when the verification result reaches the assignment indicator corresponding to the task to be assigned, the prompt information representing that the verification of the user information is passed is generated, and the sharing platform assigns the task to be assigned to the corresponding user terminal according to the prompt information. This automated verification way improves efficiency of user information verification, thereby reducing labor and time costs.

DETAILED DESCRIPTION OF EMBODIMENTS

To make the objectives, technical solutions, and advantages of the present application clearer and more comprehensible, the present application is further illustrated in detail below in conjunction with the drawings and embodiments. It should be understood that the specific embodiments described herein are merely used to explain the present application and are not intended to limit the present application.

Figure 1:
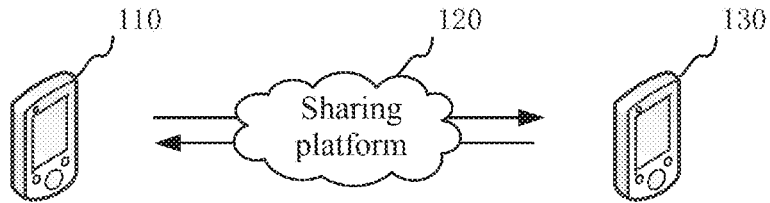
FIG. 1 is a diagram of an application scenario of a user attribute information verification method in an embodiment.

A user attribute information verification method provided in the embodiments of the present invention may be applied to an application environment shown in FIG. 1. A service party terminal 110 is connected to a sharing platform 120 via a network, and the sharing platform 120 is connected to a user terminal 130 via the network. The service party terminal 110 comprises, but is not limited to, any one of a mobile phone, a handheld game player, a tablet computer, and the like. The sharing platform 120 can be any one of a sharing economy platform, a shared task platform, and the like. The user terminal 130 comprises, but is not limited to, any one of a mobile phone, a handheld game player, a tablet computer, and the like. The service party terminal 110 acquires a task to be assigned, and generates an assignment indicator according to the task to be assigned. The service party terminal 110 uploads the task to be assigned to the sharing platform 120 via the network. The sharing platform 120 publishes the task to be assigned. The user terminal 130 receives publication of the task, and sends user information (namely, information to be verified) of the user to the sharing platform. The service party terminal 110 receives the information to be verified returned by the sharing platform 120, and evaluate the user information according to a user attribute and an attribute verification record to obtain a verification result of the user to information. When the verification result reaches the assignment indicator corresponding to the task to be assigned, the service party terminal 110 generates prompt information representing that the verification of the user information is passed, and the sharing platform 120 assigns the task to be assigned to the corresponding user terminal 130.

Figure 2:
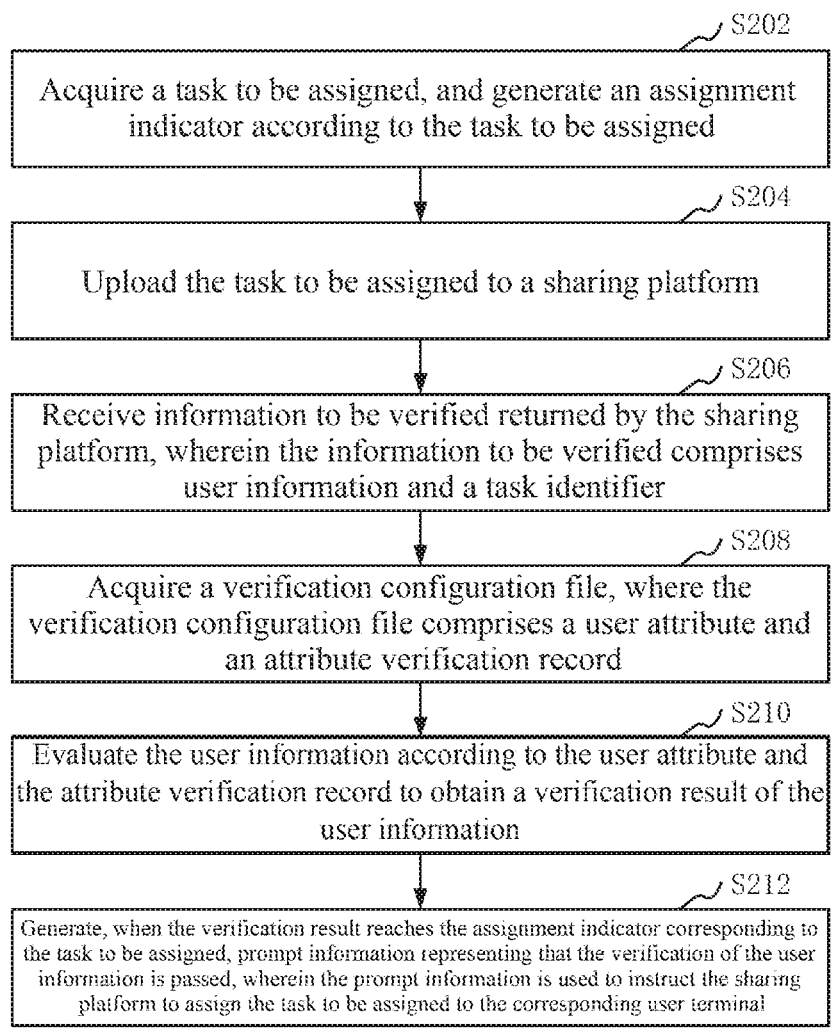
FIG. 2 is a schematic flowchart of a user attribute information verification method in an embodiment.

In an embodiment, as shown in FIG. 2, a user attribute information verification method is provided. Illustration is provided by taking the method applied to the service party terminal in FIG. 1 as an example. The method comprises:

Step 202: Acquire a task to be assigned, and generate an assignment indicator according to the task to be assigned.

The service party terminal can serve as a task publication party to publish a task to be assigned. Specifically, the service party terminal is for acquiring the task to be assigned. The task to be assigned refers to a general task, and specifically, may also comprise tasks in some task items within a company that are outsourced by the company. It can be understood that the corresponding assignment indicator will be generated according to the task to be assigned to ensure that the task to be assigned can be performed by a user who is capable of performing the task to be assigned. The assignment indicator is mainly configured according to specific content of the task or a requirement of an assignment party. The assignment indicator may comprise a specific attribute indicator and review requirement, and may also comprise a certain logic rule. For example: an identity, a skill, a qualification, experience, and tile like of a user. The review requirement is, for example: it is necessary to have support from more than five users and one trusted party.

Step 204: Upload the task to be assigned to a sharing platform.

The service party terminal uploads the task to be assigned to the sharing platform via a network. The sharing platform may comprise a sharing economy platform, or a shared task platform, and the like. The sharing platform acquires the task to be assigned uploaded by the service party terminal, and publishes task information of the task to be assigned. The sharing platform may also publish the assignment indicator corresponding to the task to be assigned at the same time, so that a user who is to receive the task can determine whether he/she meets the corresponding assignment indicator in advance. A user terminal receives the task to be assigned published by the sharing platform, and sends information of the user that is to be verified to the sharing platform for storage. In addition, it can be understood that when returning user information to the sharing platform, the user terminal can further apply privacy setting on the user information of the user terminal to hide the user information, so that when the user information is viewed, only those who pass a corresponding privacy check can view a corresponding user information record.

Step 206: Receive information to be verified returned by the sharing platform, wherein the information to be verified comprises user information and a task identifier.

The service party terminal receives the information to be verified returned by the sharing platform, wherein the information to be verified comprises the user information and the corresponding task identifier that are sent by the user terminal. The user information comprises metadata information of the user, and specifically comprises a time identifier, a user identifier, a record expiration time, and the like. The service party terminal may find a corresponding task to be assigned according to the task identifier, and acquire a corresponding assignment indicator. Specifically, the user information further comprises a user attribute and specific content thereof. For example: the user attribute in the received user information of the user comprises: age: 30, hardworking and having a master's degree. An attribute verification record comprises a username and its digital signature that provide a review for this attribute.

Step 208: Acquire a verification configuration file, wherein the verification configuration file comprises a user attribute and an attribute verification record.

The service party terminal acquires the verification configuration file, wherein the verification configuration file comprises the user attribute and the attribute verification record. The configuration tile may be configured in advance according to the task to be assigned. The configuration file is mainly used to configure various attributes for verification and corresponding attribute verification records. For example, when a task to be assigned is performed, the user's age needs to be verified, that is, an age attribute is configured in the configuration tile, and is configured according to a determination rule of a specific value corresponding to the age attribute. It can be understood that the user can add a corresponding user attribute to the user information according to the user attribute configured in the configuration file for the service party terminal to verify the user attribute of the user. The verification configuration file may be set to be viewed only by a specified patty (an email/system name) to prevent the document from being misused.

Specifically, for example: users providing a review will select an attribute of a target user they wish to review on a user data page. After selection, a system will sign a string representing the attribute and metadata using a private key of the user. The metadata comprises, but is not limited to, providing a user identifier, a date and time for review, and a valid expiration date. Review providers may choose to be reviewed from their own trusted parties to receive a higher confirmation score, wherein data of the score will be managed outside the metadata and will be stored and used according to a determination of the system. The system will record and store the complete metadata and a generated signature into a database.

Step 210: Evaluate the user information according to the user attribute and the attribute verification record to obtain a verification result of the user information.

The service party terminal may further verify the user information according to the user attribute and the attribute verification record, and specifically, evaluate the user information according to the user attribute and the attribute verification record. The service party terminal further comprises: verification rule logic, wherein a correspondence relation between the attribute verification record and a verification result is preset in the verification rule logic. The user information is verified according to the correspondence relation between the attribute verification record and the verification result in the verification logic rule to obtain the verification result of the user information. For example: if the verification rule logic is that an attribute verification record corresponding to an education attribute is a master's degree or above and that more than five persons provide a review, it is determined that the to verification result is passed; or otherwise, it is determined that the verification result fails.

Step 212: Generate, when the verification result reaches the assignment indicator corresponding to the task to be assigned, prompt information representing that the verification of the user information is passed, wherein the prompt information is used to instruct the sharing platform to assign the task to be assigned to the corresponding user terminal.

When the verification result reaches the assignment indicator corresponding to the task to be assigned, that is, when the verification result corresponding to the assignment indicator is passed or a verification score obtained from the verification result reaches a preset threshold value, the service party terminal generates prompt information representing that the verification of the user information is passed, and sends the prompt information to the sharing platform via the network. After acquiring the prompt information, the sharing platform assigns the task to be assigned corresponding to the task identifier to the user terminal that passes verification.

In the user attribute information verification method, the task to be assigned is uploaded to the sharing platform; the information to be verified returned by the sharing platform is received; the user information is evaluated according to the user attribute and the attribute verification record in the verification configuration file to obtain the verification result of the user information; and when the verification result reaches the assignment indicator corresponding to the task to be assigned, the prompt information representing that the verification of the user information is passed is generated, and the sharing platform assigns the task to be assigned to the corresponding user terminal according to the prompt information. This automated verification process improves efficiency of user information verification, thereby reducing labor and time costs.

Figure 3:
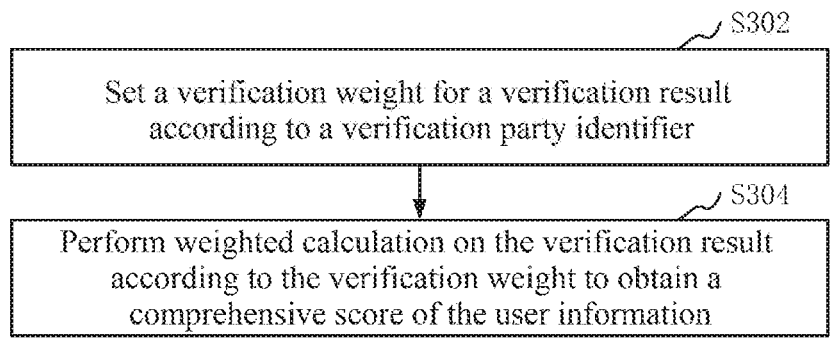
FIG. 3 is a schematic flowchart of steps of evaluating user information according to a user attribute and an attribute verification record to obtain a verification result of the user information in art embodiment.

In an embodiment, as shown in FIG. 3, the user information further comprises a verification party identifier and a corresponding verification result. The step of evaluating the user information according to the user attribute and the attribute verification record to obtain the verification result of the user information comprises:

Step 302: Set a verification weight for the verification result according to the verification party identifier.

Step 304: Perform weighted calculation on the verification result according to the verification weight to obtain a comprehensive score of the user information.

In this embodiment, as a verification party for current user information, the service party terminal is for individually scoring the user attribute according to a historical attribute verification record of the user and a verification party verification weight of each record. The user information acquired by the service party terminal further comprises: a historical verification party identifier and a corresponding verification attribute, that is, the user information uploaded by the user terminal comprises a verification result obtained after another verification party has performed verification. Credibility of different verification parties is different, for example: verification result of a government agency is obviously more reliable than a verification result of a given individual. Therefore, in an evaluation process, the service party terminal needs to set different verification weights according to verification party identifiers, and then perform weighted calculation on the verification result to obtain a comprehensive score of the user information.

In this embodiment, the user information is comprehensively scored according to the verification result already comprised in the user information, and in a scoring process different verification weights are set according to verification parties, so that the verification result obtained by verification of the user information is more accurate.

Figure 4:
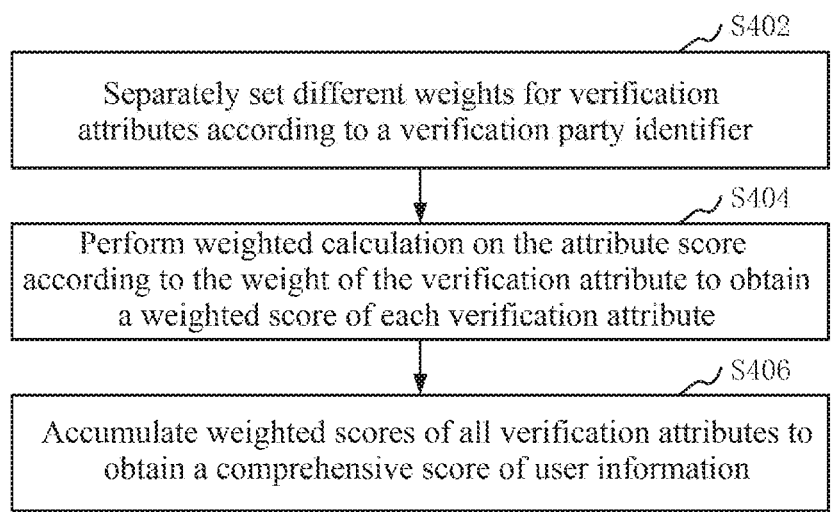
FIG. 4 is a schematic flowchart of steps of evaluating user information according to a user attribute and an attribute verification record to obtain a verification result of the user information in another embodiment.

In an embodiment, as shown in FIG. 4, the user information further comprises a verification party identifier, a verification attribute, and a corresponding attribute score. The step of evaluating the user information according to the user attribute and the attribute verification record to obtain the verification result of the user information comprises:

Step 402: Separately set different weights for the verification attributes according to the verification party identifier.

Step 404: Perform weighted calculation on the attribute score according to the weight of the verification attribute to obtain a weighted score of each verification attribute.

Step 406: Accumulate weighted scores of all verification attributes to obtain a comprehensive score of the user information.

In this embodiment, as a verification party for current user information, the service party terminal is for comprehensively scoring attribute scores of different attributes according to a user's verification record. It can be understood that credibility of attribute scores obtained by different verification parties for different attributes is different. On this basis, the service party terminal separately sets different weights for verification attributes according to historical verification party identifiers. The service party terminal performs weighted calculation on the attribute score according to the weight of the verification attribute to obtain the weighted score of each verification attribute, and accumulates the weighted scores of all the verification attributes to obtain a comprehensive score of the user information.

It can be understood that the user terminal is able to extract copies of all verification records for external use. The user terminal may send a request to the sharing platform, and the sharing platform extracts a verification history record corresponding to the user identifier through the service party terminal, and packs and collates the verification history record to obtain a copy of a verification history to generate a verification certificate. The service party terminal encrypts the collated verification certificate using the private key of the user, and sends the verification certificate to the user terminal. The user may add settings to set who can view a document to prevent the file from being misused.

In this embodiment, weighted calculation is performed on the attribute score according to the weight of the verification attribute to obtain the weighted score of each verification attribute, and the weighted scores of all the verification attributes is accumulated to obtain a comprehensive score of the user information, so that the verification result obtained by verification of the user information is more accurate.

In an embodiment, a user attribute information verification method is provided, the method further comprising: acquiring a verification party identifier of a current verification party and a corresponding private key, encrypting and signing a verification result using the verification party identifier of the current verification party and the private key, and storing a record in a service party terminal system to form a verification configuration file.

In this embodiment, a service party terminal acquires the verification party identifier of the current verification party and the corresponding private key, encrypts and signs the verification result using the verification party identifier of the current verification party and the private key, and stores the record in the service party terminal system to form the verification configuration file. An encrypted verification result stored in a sharing platform can be reused through key verification, so that the verification result is verifiable and cannot be tampered with. It can be understood that the encryption process can also be implemented by the sharing platform through the service party terminal, that is, the verification result is encrypted and signed on the service party terminal using the verification party identifier and the private key. The encrypted and signed verification result is stored on the service party terminal, and the service party terminal manages the verification result. A user may download encrypted verification configuration files from the sharing platform through a user terminal, and the sharing platform will provide permission for the user to verify the downloaded verification configuration files at any time.

In this embodiment, verification data is encrypted and signed, and a verification configuration file is encrypted when the data is exchanged outside the platform, to provide privacy control that meets regional and personal specifications, so that privacy protection of the data in the verification process is realized, reliability of the entire verification process is improved, and a requirement of a data privacy regulation is met.

Figure 5:
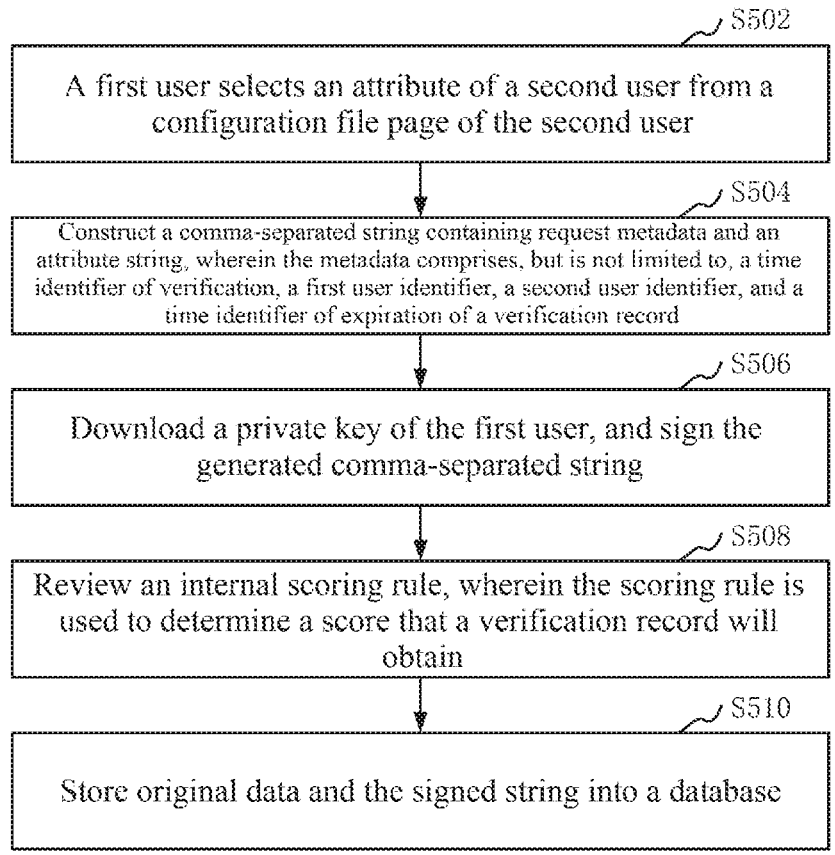
FIG. 5 is a schematic flowchart of steps of performing verification between users by applying a user attribute information verification method in another embodiment.

It can be understood that performing of the verification in the above verification process may enable a first user terminal to verify a user attribute of a second user terminal, so that different users can implement mutual attribute verification on the sharing platform, and stores verification records through the service party terminal to obtain verification results. Then, the verification result is encrypted and signed by the service party terminal using the verification party identifier and the private key, so that the verification result that is verifiable and cannot be tampered with can be obtained. Specifically, reference can be made to FIG. 5.

Step 502: A first user selects an attribute of a second user from a configuration file page of the second user.

Step 504: Construct a comma-separated string containing request metadata and an attribute string. The metadata comprises, but is not limited to, a time identifier of verification, a first user identifier, a second user identifier, and a time identifier of expiration of a verification record.

Step 506: Download a private key of the first user, and sign the generated comma-separated string.

Step 508: Review an internal scoring rule, wherein the scoring rule is used to determine a score that a verification record will obtain. It can be understood that related settings and management can be performed by different suppliers on the scoring rule to allow them to assign corresponding weights to verification of different users.

Step 510: Store original data and the signed string into a database.

In this embodiment, mutual verification between users is performed through the sharing platform, and a verification, record of the mutual verification is generated, and the verification record is available for corresponding external use.

Figure 6:
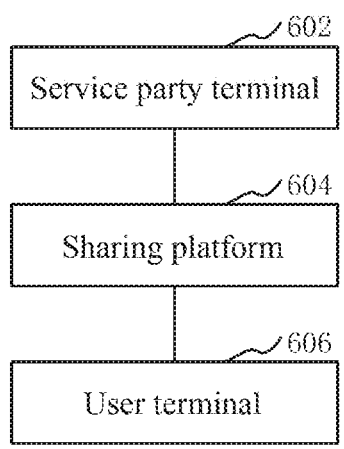
FIG. 6 is a structural block diagram of a user attribute information verification system in art embodiment.

In an embodiment, as shown in FIG. 6, a user attribute information verification system is provided, the system comprising:

a service party terminal 602 for acquiring a task to be assigned, and generating an assignment indicator according to the task to be assigned.

The service party terminal 602 is further for uploading the task to be assigned to a sharing platform 604.

The service party terminal is further for receiving information to be verified returned by the sharing platform 604, wherein the information to be verified comprises user information and a task identifier.

The service party terminal 602 is further for acquiring a verification configuration file, wherein the verification configuration file comprises a user attribute and an attribute verification record.

The service party terminal 602 is further for evaluating the user information according to the user attribute and the attribute verification record to obtain a verification result of the user information.

The service party terminal 602 is further for generating, when the verification result reaches the assignment indicator corresponding to the task to be assigned, prompt information representing that the verification of the user information is passed, wherein the prompt information is used to instruct the sharing platform 604 to assign the task to be assigned to a corresponding user terminal 606.

In an embodiment, the service party terminal 602 is further for generating verification rule logic, wherein a correspondence relation between the attribute verification record and the verifications result is preset in the verification rule logic. The service party terminal 602 is further for verifying the user information according to the correspondence relation between the attribute verification record and the verification result in the verification logic rule to obtain the verification result of the user information.

In an embodiment, the user information further comprises a verification party identifier and a corresponding verification result. The service party terminal 602 is further for setting a verification weight for the verification result according to the verification party identifier, and performing weighted calculation on the verification result according to the verification weight to obtain a comprehensive score of the user information.

In an embodiment, the user information further comprises a verification party identifier, a verification attribute, and a corresponding attribute score. The service party terminal 602 is further for separately setting different weights for the verification attributes according to the verification party identifier, performing weighted calculation on the attribute score according to the weight of the verification attribute to obtain a weighted score of each verification attribute, and accumulating weighted scores of all verification attributes to obtain a comprehensive score of the user information.

In an embodiment, the service party terminal 602 is further for acquiring a verification party identifier and a corresponding private key, encrypting the verification result using the verification party identifier and the private key, and sending the encrypted verification result to the sharing platform 604. The sharing platform 604 stores the encrypted verification result.

For a specific limitation on the user attribute information verification system, reference can be made to a limitation on the user attribute information verification method described above, and details are not described herein again.

Figure 7:
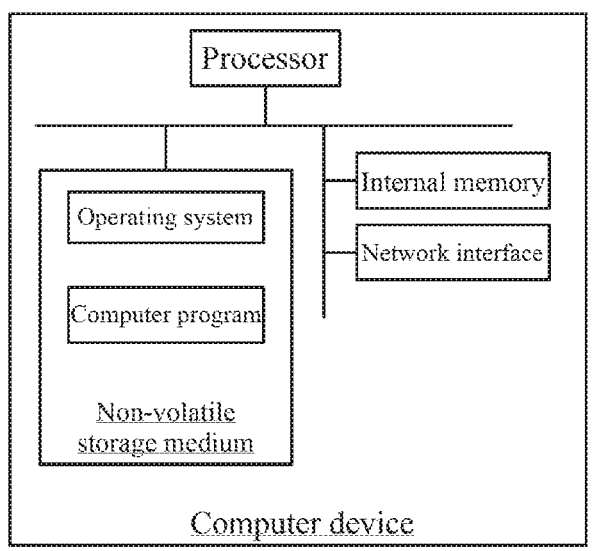
FIG. 7 is an internal structural diagram of a computer device in an embodiment.

In art embodiment, a computer device is provided, the computer device may be a service party terminal, and an internal structural diagram thereof may be Shown in to FIG. 7. The computer device comprises a processor, a memory, and a network interface that are connected via a system bus. The processor of the computer device is for providing computing and control capabilities. The memory of the computer device comprises a non-volatile storage medium and an internal memory. The non-volatile storage medium stores an operating system and a computer program. The internal memory provides an environment for operation of the operating system and the computer program in the non-volatile storage medium. The network interface of the computer device is for communicating with an external terminal via a network connection. When the computer program is executed by the processor, a user attribute information verification method is implemented.

A person skilled in the art can understand that a structure shown in FIG. 7 is merely a block diagram of a part of the structure related to the solutions of the present application, and does not constitute a limitation on the computer device to which the solutions of the present application is applied. Specifically, the computer device may comprise more or fewer components than those shown in the drawings, or combine some components, or have different component arrangements.

In an embodiment, a computer device is provided, which comprises a memory, a processor, and a computer program stored on the memory and operable on the processor, wherein when the processor executes the computer program, the steps in the above various method embodiments are implemented.

In an embodiment, a computer readable storage medium is provided, having stored thereon a computer program that, when executed by a processor, the steps in the above various method embodiments are implemented.

A person of ordinary skill in the art can understand that all or part of the flows in the methods in the above embodiments can be implemented by a computer program by instructing related hardware. The computer program can be stored in a non-volatile computer readable storage medium, and when the computer program is executed, the flows such as the embodiments of the above various methods may be comprised. Any reference to a memory, storage, a database, or other media used in various embodiments provided in the present application may comprise a non-volatile and/or volatile memory. The non-volatile memory may comprise a read only memory (ROM), a programmable ROM (PROM), an electrically programmable ROM (EPROM), an electrically erasable programmable ROM (EEPROM), or a flash memory. The volatile memory may comprise a random access memory (RAM) or an external cache memory. By way of illustration but not limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink (Synchlink) DRAM (SLDRAM), a Rambus (Rambus) direct RAM (RDRAM), a direct Rambus dynamic RAM (DRDRAM), a. Rambus dynamic RAM (RDRAM), and the like.

The technical features of the above embodiments may be combined arbitrarily. For the purpose of simplicity in description, all the possible combinations of the technical features in the above-described embodiments are not described. However, as long as there is no contradiction among the combinations of these technical features, they shall all fall within the scope of the specification.

The above embodiments merely represent several implementations of the present application, giving specifics and details thereof, but should not be understood as limiting the scope of the present patent of invention thereby. It should be noted that a person of ordinary skill in the art could also make several alterations and improvements without departing from the spirit of the present application and these would all fall within the scope of protection of the present application. Therefore, the scope of protection of the present patent of application shall be in accordance with the appended claims.

What is claimed is:

1. A user attribute information verification method, the method comprising:
    acquiring, by a service party terminal, a task to be assigned, and generating an assignment indicator according to the task to be assigned;
    uploading, by the service party terminal, the task to be assigned to a sharing platform;
    publishing, by the sharing platform, the assignment indicator and the task to be assigned at the same time;
    sending, by a user terminal, information of a user that is to be verified to the sharing platform for storage;
    applying, by the user terminal, privacy setting on the user information so that when the user information is viewed, only those who pass a corresponding privacy check can view a corresponding user information record;
    receiving, by the service party terminal, information to be verified returned by the sharing platform, wherein the information to be verified comprises user information and a task identifier;
    acquiring, by the service party terminal, a verification configuration file wherein the verification configuration file is configured in advance according to the task to be assigned and comprises a user attribute and an attribute verification record;
    evaluating, by the service party terminal, the user information according to the user attribute and the attribute verification record to obtain a verification result of the user information; and
    generating, by the service party terminal, when the verification result reaches the assignment indicator corresponding to the task to be assigned, prompt information representing that the verification of the user information is passed wherein the prompt information is used to instruct the sharing platform to assign the task to be assigned to a corresponding user terminal;
    wherein the method further comprises:
    acquiring a verification party identifier of a current verification party and a corresponding private key, and encrypting and signing the verification result using the verification party identifier of the current verification party and the private key; and adding the encrypted and signed verification result to the verification record for storage to form the verification configuration file;
    wherein the encrypted verification result stored in the sharing platform is reused through a key verification.

2. The method according to claim 1, wherein the method further comprises:
    acquiring verification rule logic, wherein a correspondence relation between the attribute verification record and the verification result is preset in the verification rule logic; and the step of evaluating the user information according to the user attribute and the attribute verification record to obtain the verification result of the user information comprises:
    verifying the user information according to the correspondence relation between the attribute verification record and the verification result in the verification logic rule to obtain the verification result of the user information.

3. The method according to claim 1, wherein the user information further comprises a verification party identifier and a corresponding verification result; and the step of evaluating the user information according to the user attribute and the attribute verification record to obtain the verification result of the user information comprises:
    setting a verification weight for the verification result according to the verification party identifier; and
    performing weighted calculation on the verification result according to the verification weight to obtain a comprehensive score of the user information.

4. The method according to claim 1, wherein the user information further comprises a verification party identifier, a verification attribute, and a corresponding attribute score; and the step of evaluating the user information according to the user attribute and the attribute verification record to obtain the verification result of the user information comprises:
    separately setting different weights for the verification attributes according to the verification party identifier;
    performing weighted calculation on the attribute score according to the weight of the verification attribute to obtain a weighted score of each verification attribute; and
    accumulating weighted scores of all verification attributes to obtain a comprehensive score of the user information.

5. A computer device, comprising a memory, a processor, and a computer program stored on the memory and operable on the processor, wherein when the processor executes the computer program, steps of the method of claim 1 are implemented.

6. A non-transitory computer readable storage medium having stored thereon a computer program, wherein when the computer program is executed by a processor, steps of the method of claim 1 are implemented.

* * * * *